(12) United States Patent
Topham et al.

(10) Patent No.: US 8,549,297 B1
(45) Date of Patent: Oct. 1, 2013

(54) DATA TRANSFER DEVICE LIBRARY AND KEY DISTRIBUTION

(75) Inventors: Andrew Topham, Bristol (GB); John William Drew, Bristol (GB); Duncan Mark Wakelin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2193 days.

(21) Appl. No.: 11/494,294

(22) Filed: Jul. 26, 2006

(30) Foreign Application Priority Data

Oct. 11, 2005 (GB) .................................. 0520602.4

(51) Int. Cl.
*G06F 21/00* (2013.01)

(52) U.S. Cl.
USPC ............................ 713/171; 380/278; 380/44

(58) Field of Classification Search
USPC ............................ 713/171; 380/278, 286, 44
See application file for complete search history.

(56) References Cited

U.S. PATENT DOCUMENTS

| | | | | |
|---|---|---|---|---|
| 4,281,216 A * | 7/1981 | Hogg et al. | .................... | 380/277 |
| 5,093,860 A * | 3/1992 | Steinbrenner et al. | ........ | 380/273 |
| 5,235,641 A | 8/1993 | Nozawa et al. | ............... | 713/193 |
| 5,481,610 A * | 1/1996 | Doiron et al. | ................. | 380/270 |
| 5,535,279 A | 7/1996 | Seestrom | | |
| 5,651,064 A | 7/1997 | Newell | ............................ | 705/51 |
| 5,748,744 A * | 5/1998 | Levy et al. | ....................... | 380/52 |
| 5,757,908 A | 5/1998 | Cooper et al. | | |
| 5,905,798 A | 5/1999 | Nerlikar et al. | | |
| 5,940,507 A * | 8/1999 | Cane et al. | .................... | 713/165 |
| 5,970,147 A | 10/1999 | Davis | | |
| 6,039,260 A * | 3/2000 | Eisele | .......................... | 235/492 |
| 6,061,791 A * | 5/2000 | Moreau | ......................... | 713/171 |
| 6,134,660 A | 10/2000 | Boneh et al. | .................. | 713/193 |
| 6,343,282 B1 | 1/2002 | Oshima et al. | | |
| 6,357,005 B1 | 3/2002 | Devaux et al. | | |
| 6,378,007 B1 | 4/2002 | Southwell | | |
| 6,381,662 B1 | 4/2002 | Harari et al. | | |
| 6,473,861 B1 | 10/2002 | Stokes | ......................... | 713/193 |
| 6,691,226 B1 | 2/2004 | Frank et al. | | |
| 6,754,827 B1 * | 6/2004 | Cane et al. | .................... | 713/193 |

(Continued)

FOREIGN PATENT DOCUMENTS

| | | | |
|---|---|---|---|
| EP | 0 913 823 A2 | 5/1999 | |
| EP | 1 020 856 A2 | 7/2000 | |

(Continued)

OTHER PUBLICATIONS

Delbrey, Jerry. "Database of Mechanical Properties of Textile Composites". Aug. 1996. Available at http://www.cs.odu.edu/~mln/ltrs-pdfs/NASA-96-cr4747.pdf. Downloaded Jul. 31, 2010.*

(Continued)

*Primary Examiner* — David Garcia Cervetti

(57) ABSTRACT

A method of distributing a key to encrypt data for storing on a removable data storage item in a data transfer device library, the library comprising a controller having a key associated therewith and being connected to a plurality of data transfer devices each being operable to transfer data to a removable data storage item and having a key store, the method comprising: providing the key for the library to the controller; the controller providing the key to the key store of each data transfer device connected to the controller. A data transfer device library is also disclosed.

19 Claims, 3 Drawing Sheets

(56) References Cited

U.S. PATENT DOCUMENTS

| | | | |
|---|---|---|---|
| 6,845,450 B1* | 1/2005 | Kobayashi et al. | 726/5 |
| 7,031,470 B1 | 4/2006 | Bar-on | |
| 7,099,477 B2* | 8/2006 | Bade et al. | 380/279 |
| 7,181,624 B2 | 2/2007 | Asano et al. | |
| 7,200,546 B1* | 4/2007 | Nourmohamadian et al. | 703/24 |
| 7,277,941 B2* | 10/2007 | Ignatius et al. | 709/225 |
| 7,278,016 B1 | 10/2007 | Detrick et al. | |
| 7,599,496 B2* | 10/2009 | Hengeveld et al. | 380/278 |
| 7,627,756 B2* | 12/2009 | Fujibayashi et al. | 713/165 |
| 7,818,585 B2* | 10/2010 | Kilian-Kehr et al. | 713/193 |
| 7,865,440 B2* | 1/2011 | Jaquette | 705/51 |
| 7,869,603 B2* | 1/2011 | Goodman et al. | 380/277 |
| 7,869,604 B2* | 1/2011 | Goodman et al. | 380/277 |
| 7,920,706 B2* | 4/2011 | Asokan et al. | 380/277 |
| 7,995,603 B2* | 8/2011 | Revital et al. | 370/432 |
| 8,160,257 B1* | 4/2012 | Chaudhary et al. | 380/278 |
| 2001/0033656 A1* | 10/2001 | Gligor et al. | 380/28 |
| 2003/0051146 A1* | 3/2003 | Ebina et al. | 713/185 |
| 2003/0074319 A1* | 4/2003 | Jaquette | 705/51 |
| 2003/0177094 A1* | 9/2003 | Needham et al. | 705/50 |
| 2003/0204717 A1 | 10/2003 | Kuehnel | |
| 2003/0233573 A1* | 12/2003 | Phinney | 713/200 |
| 2004/0078584 A1* | 4/2004 | Moroney et al. | 713/189 |
| 2004/0101138 A1* | 5/2004 | Revital et al. | 380/210 |
| 2004/0101140 A1* | 5/2004 | Abe | 380/277 |
| 2004/0101141 A1* | 5/2004 | Alve | 380/278 |
| 2004/0103292 A1* | 5/2004 | Shirouzu | 713/193 |
| 2004/0107340 A1* | 6/2004 | Wann et al. | 713/153 |
| 2004/0186991 A1* | 9/2004 | Kobayashi et al. | 713/153 |
| 2004/0190860 A1* | 9/2004 | Ishiguchi | 386/46 |
| 2004/0196759 A1* | 10/2004 | Ishibashi et al. | 369/47.19 |
| 2004/0215955 A1 | 10/2004 | Tamai et al. | |
| 2005/0052661 A1* | 3/2005 | Lapstun et al. | 358/1.1 |
| 2005/0071591 A1* | 3/2005 | Goodman et al. | 711/163 |
| 2005/0152670 A1* | 7/2005 | Skaar | 386/46 |
| 2005/0195979 A1* | 9/2005 | Arling et al. | 380/274 |
| 2005/0219600 A1* | 10/2005 | Lapstun et al. | 358/1.14 |
| 2005/0226420 A1* | 10/2005 | Makela et al. | 380/270 |
| 2005/0257062 A1* | 11/2005 | Ignatius et al. | 713/176 |
| 2005/0262361 A1* | 11/2005 | Thibadeau | 713/193 |
| 2005/0278257 A1 | 12/2005 | Barr et al. | 705/57 |
| 2006/0015946 A1* | 1/2006 | Yagawa | 726/32 |
| 2006/0215305 A1* | 9/2006 | Yasue et al. | 360/71 |
| 2006/0224902 A1* | 10/2006 | Bolt | 713/193 |
| 2006/0239165 A1* | 10/2006 | Kobayashi et al. | 369/53.34 |
| 2006/0242431 A1* | 10/2006 | LeCrone et al. | 713/193 |
| 2006/0245329 A1* | 11/2006 | Kobayashi et al. | 369/59.11 |
| 2007/0101442 A1* | 5/2007 | Bondurant | 726/34 |
| 2007/0136606 A1* | 6/2007 | Mizuno | 713/189 |
| 2007/0180239 A1* | 8/2007 | Fujibayashi et al. | 713/165 |
| 2007/0198855 A1* | 8/2007 | Kuroda et al. | 713/189 |
| 2007/0226520 A1* | 9/2007 | Kuroda | 713/193 |
| 2008/0219449 A1* | 9/2008 | Ball et al. | 380/277 |
| 2012/0084263 A1* | 4/2012 | Gosnell | 707/667 |

FOREIGN PATENT DOCUMENTS

| | | |
|---|---|---|
| EP | 1 185 020 A1 | 3/2002 |
| EP | 1 267 245 A2 | 12/2002 |
| EP | 1 333 353 A2 | 8/2003 |
| EP | 1 367 764 A2 | 12/2003 |
| EP | 1440439 | 7/2004 |
| EP | 1 367 764 A3 | 1/2005 |
| EP | 1 585 006 A2 | 10/2005 |
| EP | 1 615 368 A1 | 1/2006 |
| GB | 2 264 373 A | 8/1993 |
| GB | 2 315 575 A | 7/1996 |
| GB | 2 330 682 A | 4/1999 |
| WO | 02/05482 A1 | 1/2002 |
| WO | 03/034425 A1 | 4/2003 |

OTHER PUBLICATIONS

"Cryptostor Tape", NeoScale Systems, retrieved from http://www.neoscale.com/English/Products/cryptoStor_Tape.html on Nov. 29, 2005.

"Cryptostore Tape 700 Family—Enterprise Class Tape Appliances," Neoscale Systems, 2002.

"Cryptostore for Tape-Storage Security Appliance for Backup," Neoscale Systems, 2002.

Marisa, M., "Tape Inscription Devices: Host/based vs. Appliance New Tape Measure", *Storage and Server Technology*, Retrieved Nov. 28, 2005 <http://www.networkcomputing.com/shared/artic/printFullArticleSrc.jhtml?articleID=173602939>.

"CryptoStor Tape". *NeoScale systems*, Retrieved Nov. 29, 2005 <http://www.neoscale.com/English/Products/CryptoStor_Tape.html>.

\* cited by examiner

DATA TRANSFER DEVICE LIBRARY AND KEY DISTRIBUTION

FIELD OF THE INVENTION

This invention relates to a data transfer device library and a method of key distribution.

BACKGROUND OF THE INVENTION

Many institutions and corporations back up their data and use removable data storage items such as tape cartridges for storage. Data are usually backed up in a secure location such as an off-site library from where data can be restored in the event of disaster recovery. There have been instances of company data potentially losing its confidentiality due to the loss of backup tape cartridges. In the event that the data on a lost tape cartridge has not been encrypted, that data would be relatively easy for a non-authorised user to read. That situation is undesirable.

Where the backed up data are extremely sensitive, a need is perceived to encrypt the data and thereby improve security. Encryption technology exists that can make the data on tape cartridges unreadable to any person without a correct decryption key. There may be a separate encryption/decryption key. It is difficult to manage the availability of encryption, decryption and encryption/decryption keys, especially keys in an environment with multiple tape drives such as a tape library.

Current encryption solutions concentrate on encrypting the data either at source or on the wire.

The encryption at source solutions use software encryption running on the computer to which the backup devices are attached. This has the advantage of avoiding sending un-encrypted data over a network. However, such software-based encryption is typically slow and can impact backup performance. Also, the software must have some form of associated key management so one does not escape the problem of key management.

Encryption on the wire involves breaking the direct connection between the writing computer and the backup device and inserting an encrypting appliance into the break. This is generally a very expensive solution since such encrypting appliances are expensive. There is also again the key management issue.

SUMMARY OF THE INVENTION

The invention seeks to provide encryption in a multiple data transfer device environment without the user needing to become involved in the complexities of key management.

In accordance with the invention there is provided a method of distributing a key to encrypt data for storing on a removable data storage item in a data transfer device library, the library comprising a controller having a key associated therewith and being connected to a plurality of data transfer devices each being operable to transfer data to a removable data storage item and having a key store, the method comprising: providing the key for the library to the controller; the controller providing the key to the key store of each data transfer device connected to the controller.

Preferably, the controller, upon initialisation of the library, provides the key to the key store of each data transfer device connected to the controller.

Advantageously, all the data written to the removable data storage items by the data transfer devices in the library are encrypted with the key in the key store of each data transfer device, the keys being the same.

Conveniently, data are encrypted using a block encryption technique in which each block of data is encrypted using the key and a respective counter value.

Preferably, comprising maintaining a library database containing records of respective libraries and the key associated with a respective library.

In accordance with a further aspect of the invention, there is provided a data transfer device library comprising a plurality of data transfer devices connected to a controller having a key associated therewith, each data transfer device having a key store and being operable to encrypt data using a key stored in the key store and to transfer encrypted data to a removable data storage item, wherein the controller is operable to provide the key associated therewith to the key store of each data transfer device.

Preferably, the controller is a library controller and has a library key store pre-programmed with the key.

Alternatively, the controller is distinct from a library controller and has a library key store pre-programmed with the key.

Advantageously, the controller has a non-volatile memory in which the key is writeable.

Conveniently, the controller is operable to provide the key to the key store of each data transfer device in response to initialisation of the library.

Preferably, the controller is operable to receive a new key and to provide the new key to the key store of each data transfer device.

Advantageously, the library is a tape drive library; the data transfer devices are tape drives; and the data storage items are tape cartridges.

In accordance with a still further aspect of the invention, there is provided a data transfer device library comprising a plurality of data transfer devices, each data transfer device having means for storing a key; means for encrypting data using a key stored in the storing means; and means for transferring encrypted data to a removable data storage item, wherein the data transfer device library further comprises: means for storing an encryption key associated with the data transfer device library; and means for providing the encryption key to the storing means of each data transfer device.

In accordance with a yet further aspect of the invention, there is provided a method of key management comprising: generating an encryption key; providing the encryption key to a data transfer library, the data transfer library having a unique library identifier and employing the encryption key to encrypt all data transferred to the data transfer library; storing an association of the encryption key and the unique library identifier; and subsequently providing a copy of the encryption key in the event that a copy of the unique library identifier is provided.

Preferably, storing an association comprises maintaining a database of encryption keys and associated unique library identifiers.

Advantageously, the method is performed by a manufacturer of the data transfer library.

Conveniently, the method is performed by a trusted third party distinct from the manufacturer and/or user of the data transfer library.

Preferably, the encryption key is provided to a controller of the data transfer library, and the controller is operable to distribute the encryption key to all data transfer devices within the data transfer library, each data transfer device using the encryption key to encrypt data and store encrypted data to a removable data storage item.

Advantageously, providing a copy of the encryption key comprises providing the encryption key to a new data transfer library.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

Figure 1:
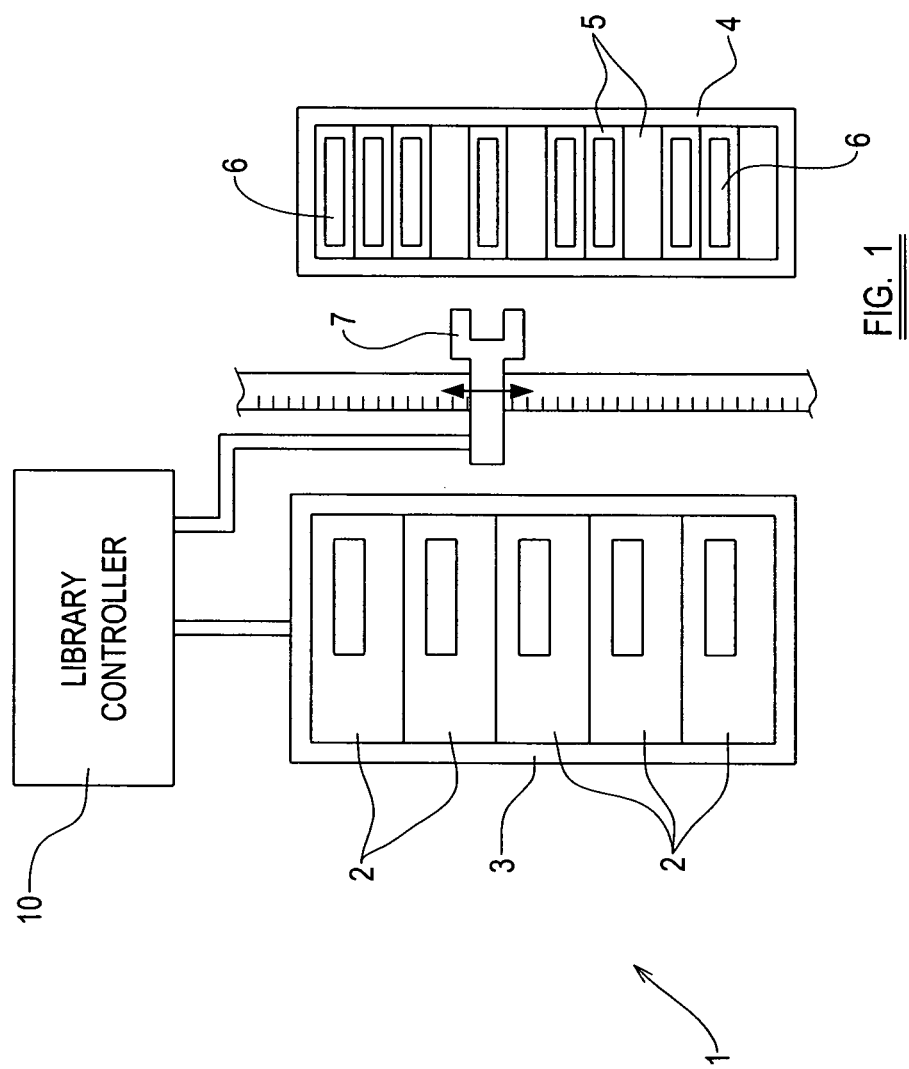
FIG. 1 is a schematic block diagram of a data transfer device library embodying the present invention.

Referring to FIG. 1, a library 1 comprises a plurality of data transfer devices 2 which are stacked in a rack 3 or otherwise physically arranged with respect to an array 4 of storage bays 5 which contain removable data storage items 6. There is in this example a controlled robot picker 7 operable to select a data storage item, insert that item in a data transfer device to read from or written to and to replace the item in a bay. A library controller 10 is operable to coordinate operations within the library and may also be the mechanism which controls the picker, although the operations performed by the picker may also be performed manually. The library controller 10 has a key memory 11 to store an encryption/decryption key together with the serial number of the library 1 (or some other unique identifier of the library). The library key memory 11 is non-volatile.

Figure 2:
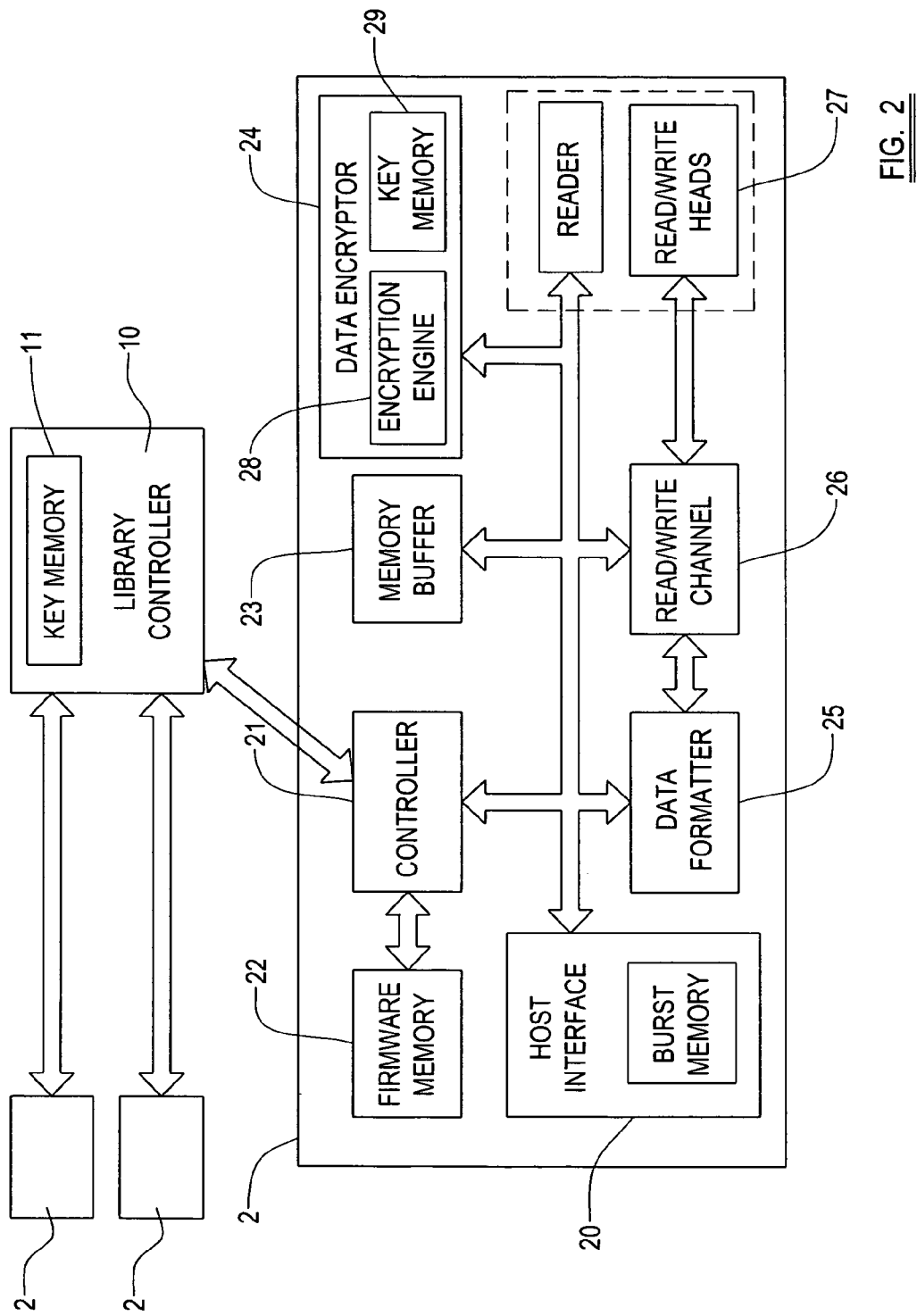
FIG. 2 is a schematic block diagram of a controller and tape drives of the library of FIG. 1.

Referring now to FIG. 2, each tape drive 2 in the library 1 comprises a host interface 20, a controller 21, firmware memory 22, a memory buffer 23, a data encryptor 24, a data formatter 25, a read/write channel 26, and magnetic read/write heads 27.

With the exception of the data encryptor 24 and the software stored in the firmware memory 22, the components of the tape drive 2 are identical to those employed in conventional tape drives.

The controller 21 of the tape drive 2 comprises a microprocessor and executes instructions stored in the firmware memory 22 to control the operation of the tape drive 2. In particular, the controller 21 responds to control commands received from the library controller 10.

As previously mentioned, the drive 2 contains a data encryptor 24 comprising an encryption engine 28 and a drive key memory 29 which are incorporated into the chipset of the tape drive. The encryption engine 28 is operable to encrypt data incoming to the tape drive with the key stored in the drive key memory 29 before writing the then encrypted data to the tape cartridge via the read/write channel 26 and the read/write heads 27. Conversely, the encryption engine 28 is operable to decrypt data read from the tape cartridge with the key stored in the drive key memory 29 before passing decrypted data to a host computer by the host interface 20. The encryption engine 28 in each tape drive 2 relies on being supplied with the encryption key. This key is supplied by the library controller 10.

The library controller 10 is the controller that is also used to control the movement of the tape cartridges 6 by the robotic picker 7. There could, however, be an incorporated or distinct other controller in the library that is either dedicated to the task of supplying keys or provides other functionality such as management of the library. Any existing communication path between the tape drive and the library controller 10 may be used to pass the key to the tape drive 2. The communication path should not, however, involve the host interface 20 of the tape drive 2 so as to provide no opportunity for snooping the key via that route.

Figure 3:
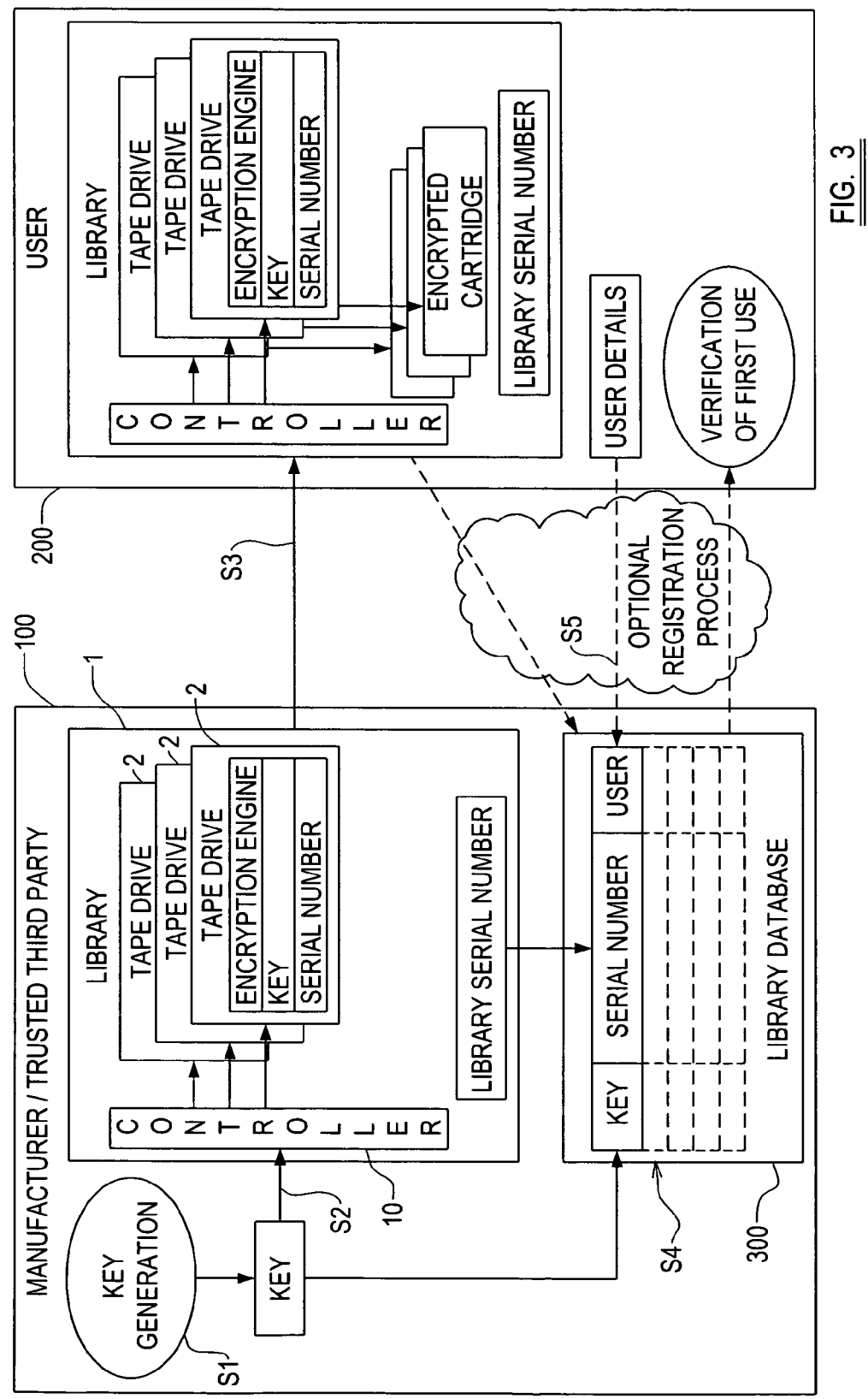
FIG. 3 is a diagram illustrating a method embodying the present invention.

The method of key distribution is as follows and as illustrated in FIG. 3. Initially, the manufacturer 100 or a trusted third party (hereinafter manufacturer) generates S1 a unique encryption key suitable for use in an encryption engine of a tape drive to encrypt data for transfer to a tape. The generated key is pre-programmed S2 into the library key memory 11 which lies in the library controller. Each of these keys is unique to that particular library 1 and is stored in the library controller key memory 11 along with the library serial number or other unique library identifier for that library 1.

Each library 1, comprising at least of a library controller 10 and plurality of tape drives 2, is shipped S3 by the manufacturer 100 with the key pre-programmed into the library key memory 11 to a user 200, usually a corporate entity.

The library manufacturer 100 or trusted third party maintains S4 a library database 300 that matches the serial number of each library 1 to the pre-programmed key associated with that library 1. In the optional event that the user 200 registers their library 1 with the library database, user information will also be appended S5 to the record for that library. User information may be maintained in the record by the manufacturer 100 who is usually aware of the identity of the end user. This provides a recovery solution in the case of a disaster with the library 1. In that case, the manufacturer 100 is able to supply S3 a replacement library 1 to the user 200 pre-programmed with the same key for recovering the user's data. This replacement key will thus be the same as the key used to encrypt the data on the user's tape cartridges.

Registration of the library 1 by the user 200 is optional but there are benefits in that the manufacturer 100 can maintain the library database 300 and cross-check the record for that library with information derived from the user 200—that being library serial number and user information—and flag any discrepancies. Upon registration of a library with the library database 300, the manufacturer 100 may also provide acknowledgement and verification of first use of the library 1 so as to confirm that the single key is being used to encrypt data for that library's tape cartridges.

The step of programming S2 the key into the library 1 and maintaining the library database 300 could be moved to a trusted third party if it was desired to prevent the original manufacturer having access to the keys.

As a part of the normal initialisation sequence of each library (which may take place when the library 1 is in the care of the manufacturer 100 or the user 200), the library controller 10 embodying the invention also writes the key stored in the library key memory 11 into the drive key memory 29 of each of the tape drives 2 in the library 1. This ensures that all cartridges that are written in that library are encrypted with the same key and so may be read by any tape drive in that library. Since the drive key memory 29 can be repopulated with the key from the non-volatile library key memory 11, it is not essential for the drive key memory 29 to be non-volatile.

Because such a large volume of data (all the tape cartridges in a library) are encrypted using the same encryption key, it is prudent to use a block encryption technique in which each block of data is encrypted using the same encryption key but different counter values, for example, using Gallois Counter Mode encryption. By ensuring that all tape cartridges still maintain unique key and counter combinations, the confidentiality of the data is not compromised even though so many cartridges are written using the same key.

Further, by providing software access to the key memory 11 in the tape library, the key can be updated as needed. The updated key would be distributed by the library 1 to all the tape drives 2 in the library 1. Clearly the library database 300 maintaining records of the library serial number and encryption key would also need to be updated if the key is changed.

The main advantage of this arrangement is that lack of any key management tasks for the user. A user may use a library using this invention in the same way as they use a similar library with no encryption. As long as any restoring of data is done with this library, then there is no change to existing processes. Thus, this appeals to users who recognise the need for encryption but are not prepared to put any effort into managing the process.

A further advantage of the present invention is that in the event that encrypted data need to be recovered from the tape cartridges of a single library, then only the one key for that entire library needs to be sent securely to the library to recover the data.

The very simple key management also lessens the likelihood of creating problems matching the appropriate key to each cartridge.

Although embodiments of the present invention have been described with reference to a tape drive 3, it will be appreciated that the present invention is equally applicable to other types of data transfer devices, such as optical drives, in which data are stored to removable data storage items (e.g. CDs, DVDs).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of distributing an encryption key to encrypt data for storing on removable data storage items in a data transfer device library that is connected to a plurality of data transfer devices each being operable to transfer data to one of the removable data storage items and having a key store, the method comprising:
storing the encryption key in the library during manufacturing of the library;
providing the encryption key to a controller in the library; and
writing the encryption key from the controller to each of the plurality of data transfer devices so each of the plurality of data transfer devices encrypt data to the removable data storage items using the encryption key.

2. The method according to claim 1 further comprising:
storing, at a manufacturer of the library, the encryption key and an identification number of the library;
supplying a replacement library as a recovery solution to a customer, the replacement library being pre-programmed with the encryption key to enable the customer to recover data stored on the removable data storage items.

3. The method according to claim 1 further comprising:
shipping the library from a manufacturer to a customer with the encryption key stored in the library.

4. The method according to claim 1, wherein the data are encrypted in each of the plurality of data transfer devices using a block encryption technique in which each block of data is encrypted using the encryption key and a different counter value.

5. The method according to claim 1 further comprising:
encrypting data on the removable data storage items with the encryption key at each of the plurality of data transfer devices so the data on the removable data storage items can be read by any of the plurality of data transfer devices.

6. A data transfer device library comprising:
a controller having an encryption key that is programmed into the controller by a manufacturer of the library; and
a plurality of data transfer devices connected to the controller and each having a key store that stores the encryption key, wherein the controller provides the encryption key to each of the plurality of data transfer devices during initialization of the library so each of the plurality of data transfer devices encrypts data to removable data storage items using the encryption key.

7. The library according to claim 6, wherein the controller is programmed with the encryption key during manufacturing of the library.

8. The library according to claim 6, wherein the library is shipped to a customer with the encryption key programmed into the controller.

9. The library according to claim 6, wherein the manufacturer of the library maintains the encryption key so the manufacturer can provide a customer with a replacement library that is programmed with the encryption key to enable the customer to recover data stored on the removable data storage items.

10. The library according to claim 6, wherein the controller is operable to provide the encryption key to the key store of each data transfer device in response to initialization of the library.

11. The library according to claim 6, wherein the controller is operable to receive a new key and to provide the new key to the key store of each data transfer device.

12. The library according to claim 6, wherein:
the library is a tape drive library;
the data transfer devices are tape drives; and
the data storage items are tape cartridges.

13. The library according to claim 6, wherein each of the plurality of data transfer devices encrypt data to the removable data storage items using a same encryption key so the data on the removable data storage items can be read by any of the plurality of data transfer devices.

14. A method of key management comprising:
generating an encryption key;
storing the encryption key in a data transfer library so the data transfer library can be shipped to a customer with the encryption key, the data transfer library having a unique library identifier and employing the encryption key to encrypt all data transferred to the data transfer library;
storing, with a third party separate from the customer, the encryption key and the unique library identifier; and
subsequently providing a copy of the encryption key from the third party to the customer in the event that a copy of the unique library identifier is provided to the third party by the customer.

15. The method according to claim 14, wherein the encryption key is generated by a manufacturer of a data transfer library.

16. The method according to claim 14 further comprising:
   writing the encryption key to each of a plurality of tape drives when the data transfer library is initialized so each of the plurality of tape drives can encrypt data to tape cartridges with the encryption key.

17. The method according to claim 14, wherein the third party is distinct from the customer and a manufacturer of the data transfer library.

18. The method according to claim 14, wherein the encryption key is provided to a controller of the data transfer library, and the controller is operable to distribute the encryption key to all data transfer devices within the data transfer library, each data transfer device using the encryption key to encrypt data and store encrypted data to a removable data storage item.

19. The method according to claim 14 further comprising:
   supplying a replacement library as a recovery solution to the customer, the replacement library being pre-programmed with the encryption key to enable the customer to recover data stored on a removable data storage items.

* * * * *